2,936,312

3-OXYGENATED 6,17α-DIMETHYLANDROSTAN-17β-OLS

John C. Babcock, Portage Township, Kalamazoo County, and J Allan Campbell, Kalamazoo, Mich., assignors to The Upjohn Company, Kalamazoo, Mich., a corporation of Michigan No Drawing. Application February 10, 1958
Serial No. 714,024

7 Claims. (Cl. 260—397.4)

This invention relates to 3-oxygenated 6,17α-dimethylandrostan-17β-ols and is more particularly concerned with 6,17α-dimethyl-17β-hydroxyandrostan-3-one and 6,17α-dimethylandrostane-3β,17β-diol (both the 6α and 6β-methyl isomers) and to processes for the production thereof.

The new compounds of this invention are illustratively represented by the following formula:

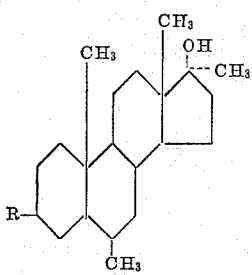

wherein R is selected from the group consisting of keto and β-hydroxy.

The new compounds of this invention possess anabolic, progestational, antiestrogenic, gonadotropin inhibiting and anti-inflammatory activity. For example, 6β,17α-dimethylandrostane-3β,17β-diol possesses higher anti-inflammatory activity than the analogous steroid not methylated at the 6-position.

Administration of the novel steroids can be in conventional dosage forms such as pills, tablets, capsules, syrups or elixers for oral use, or in liquid forms which are adaptable to the natural and synthetic cortical steroid hormones for injectable products.

It is an object of the present invention to provide 3-oxygenated - 6,17α-dimethylandrostan-17-ols, particularly 6α,17α-dimethyl-17β-hydroxyandrostan-3-one, 6β,17α-dimethyl - 17β - hydroxyandrostan-3-one, 6α,17α-dimethylandrostane-3β,17β-diol, and 6β,17α-dimethylandrostane-3β,17β-diol. A further object is to provide processes for the production of 6α,17α-dimethyl-17β-hydroxyandrostan-3-one, 6β,17α-dimethyl-17β-hydroxyandrostan-3-one, 6α,17α-dimethylandrostane-3β,17β-diol and 6β,17α-dimethylandrostane-3β,17β-diol and 6β,17α-dimethylandrostane-3β,17β-diol. Other objects of the present invention will be apparent to those skilled in the art to which this invention pertains.

The compounds of the present invention are prepared from 6,17α-dimethyltestosterone by reduction with a reducing agent, for example with an alkali metal such as sodium or lithium in liquid ammonia or by catalytic hydrogenation. Using anhydrous liquid ammonia the 4,5-double bond is reduced but not the 3-keto group. Reduction of the 4,5 double bond with an alkali metal in liquid ammonia in the presence of an alcohol, such as methanol, ethanol, tertiary butyl alcohol, and the like results in concomitant reduction of the 3-keto group to a 3β-hydroxy group. If desired, the 3β-hydroxy group can be oxidized, for example with sodium dichromate in a two-phase mixture of methylene chloride and dilute sulfuric acid, or with chromium trioxide in aqueous acetic acid, to a 3-keto group. Hydrogenation conditions can be chosen to reduce both the 4,5-double bond and the 3-ketone, as with a platinum catalyst, or solely the double bond, as with palladium catalyst. After reduction of the double bond by means of hydrogen over a palladium catalyst or an alkali metal in anhydrous liquid ammonia the 3-keto group can be further reduced, for example with lithium aluminum hydride, to a 3β-hydroxy group.

In hydrogenation with a palladium catalyst the catalyst is supported on charcoal, barium sulfate, zinc oxide, calcium carbonate, and the like. The hydrogenation is usually conducted in a solvent medium. Alkanols, such as methanol, ethanol, tertiary butyl alcohol and the like, hexane, acetone, methyl ethyl ketone, dioxane, acetic acid, ethyl acetate or like organic solvents may be advantageously employed. The catalyst can be saturated with hydrogen prior to the introduction of the steroid or preferably the steroid, catalyst and supporting media can be contacted together in a solvent medium prior to introduction of the hydrogen. It is not necessary to conduct the reaction under pressure, although, when pressure is utilized, a hydrogen gage pressure of about one to 100 pounds or more is operative, a pressure of from about ten to 25 pounds is preferred. Any suitable temperature between about zero and 100 degrees centigrade can be employed, with room temperature being satisfactory. Hydrogenation is continued until approximately one molar equivalent of hydrogen has been absorbed. The catalyst is then separated from the solution by filtration and the hydrogenated products separated by conventional separation or extraction procedures such as those illustrated in the examples which follow.

When reduction is accomplished with an alkali metal such as, for example, lithium, sodium, potassium, and the like, with sodium being preferred, the reaction is conducted in liquid ammonia for a period of a few minutes to about four hours. In addition to the liquid ammonia a solvent such as, for example, ether, tetrahydrofuran, dioxane, ethanol and the like, or mixtures thereof, can be employed if desired using an alcohol if reduction of the 3-keto group is desired. On completion of the reaction, the reaction mixture is acidified, preferably by addition of ammonium chloride, the ammonia is allowed to evaporate, and the product is isolated by conventional procedures such as filtration or extraction with an organic solvent. Purification by chromatography and recrystallization can be employed if desired.

The following preparations and examples are illustrative of the process and products of the present invention and are not to be construed as limiting.

PREPARATION 1

6β,17α-dimethyltestosterone

To a solution of two grams of 5α,17β-dihydroxy-6β,17α-dimethylandrostan-3-one [Ackroyd, Adams, Ellis, Petrow and Stuart-Webb, J. Chem. Soc. 4103 (1957)] in 300 milliliters of 95 percent ethanol, under a nitrogen atmosphere, was added fifteen milliliters of 0.1 normal sodium hydroxide. After 4.5 hours the solution was neutralized by addition of four drops of glacial acetic acid and then was concentrated to about ten milliliters by evaporation under diminished pressure. The resulting mixture was diluted with water to about thirty milliliters, giving a precipitate which was separated by filtration, washed with water, dried, and recrystallized from acetone. There was thus obtained 1.33 grams of 6β,17α-dimethyl-testosterone, having a melting point of 160 to 161 degrees centigrade, a rotation $[\alpha]_D$ of plus 28 degrees in chloroform, an ultraviolet absorption maximum, $a_M$ of 15,500 at 242.5 millimicrons, and the following analysis:

Anal.—Calculated for $C_{21}H_{32}O_2$: C, 79.69; H, 10.19. Found: C, 79.15; H, 10.27.

EXAMPLE 1

6β,17α-dimethyl-17β-hydroxyandrostan-3-one

To a solution of three grams of 6β,17α-dimethyltestosterone in 150 milliliters of 95 percent ethanol was added 0.3 gram of five percent palladium on charcoal. The suspension was shaken with hydrogen under pressure for ten minutes, by which time the theoretical amount of hydrogen had been absorbed. The reaction mixture was filtered through diatomaceous earth filter aid to remove the catalyst and the filtrate was concentrated to dryness, dissolved in acetone, and again filtered through diatomaceous earth filter aid. The acetone filtrate was concentrated by evaporation and then was diluted while hot with Skellysolve B hexanes, and cooled to give 1.6 grams of crystals. The thus obtained crystals were recrystallized from a mixture of acetone and Skellysolve B hexanes to give 6β,17α-dimethyl - 17β - hydroxyandrostan - 3 - one having a melting point of 168 to 172 degrees centigrade, a rotation $[\alpha]_D$ of minus 21 degrees in chloroform and the following analysis:

Anal.—Calculated for $C_{21}H_{34}O_2$: C, 79.19; H, 10.76. Found: C, 78.90; H, 10.94.

Alternatively, one gram of 6β,17α-dimethylandrostane-3β,17β-diol (from Example 2) is dissolved in sixty milliliters of methylene chloride and a solution of 0.5 gram of sodium dichromate in five milliliters of dilute sulfuric acid (fifty parts by volume of water to eight parts by volume of concentrated sulfuric acid) is added. The two phase reaction mixture is stirred seventeen hours at room temperature, then ten milliliters of methanol is added. After stirring an additional two hours the mixture is diluted with water and the aqueous and the methylene chloride phases are separated. The methylene chloride solution is washed with water, dried over sodium sulfate, and concentrated to dryness, giving a residue. The residue is dissolved in methanol and boiled until colorless or nearly so, then is evaporated to dryness giving a residue. The residue is then dissolved in methylene chloride and the solution is filtered through a diatomaceous earth filter aid. The filtrate is evaporated to dryness leaving a residue which is crystallized from a mixture of acetone and Skellysolve B hexanes to give 6β,17α-dimethyl-17β-hydroxyandrostan-3-one.

EXAMPLE 2

6β,17α-dimethylandrostane-3β,17β-diol

A solution of one gram of 6β,17α-dimethyltestosterone in twelve milliliters of dioxane was added to a stirred solution of one gram of sodium metal in 150 milliliters of liquid ammonia. After one hour six milliliters of tertiary butyl alcohol was added to the reaction mixture. After two more hours the blue color had disappeared, then five grams of ammonium chloride was added and the ammonia was allowed to evaporate. The residual liquid was diluted with water and extracted with ether. The ether extracts were washed with dilute aqueous hydrochloric acid, then water, combined, and dried over sodium sulfate. The ether solution was evaporated to dryness giving a residue which was dissolved in methylene chloride and chromatographed over eighty grams of Florisil synthetic magnesium silicated. Development of the column with six to eight percent acetone in Skellysolve B hexanes, followed by crystallization from a mixture of ethyl acetate and Skellysolve B hexanes, gave 0.6 gram of 6β,17α-dimethyl-androstane-3β,17β-diol, having a melting point of 165 to 173 degrees centigrade. This was recrystallized from a mixture of acetone and Skellysolve B hexanes to obtain an analytical sample of 6β,17α-dimethylandrostane-3β,17β-diol having a melting point of 178 to 179 degrees centigrade, a rotation $[\alpha]_D$ of minus 31 degrees in chloroform and the following analysis:

Anal.—Calculated for $C_{21}H_{36}O_2$: C, 78.69; H, 11.32. Found: C, 78.74; H, 11.58.

Alternatively, one gram of 6β,17α-dimethyl-17β-hydroxyandrostan-3-one (from Example 1) is dissolved in twenty milliliters of benzene and added slowly, with stirring, to a solution of 0.5 gram of lithium aluminum hydride in 100 milliliters of absolute ether. The reaction mixture is stirred for three hours, then the excess lithium aluminum hydride is decomposed by cautious addition of ten milliliters of ethyl acetate followed by ten milliliters of water. The resulting mixture is filtered and the solvent is removed from the filtrate by evaporation under diminished pressure, giving a residue. The residue is crystallized from a mixture of acetone and Skellysolve B hexanes giving 6β,17α-dimethylandrostane-3β,17β-diol.

EXAMPLE 3

6α,17α-dimethylandrostane-3β,17β-diol

In the same manner as given in Example 2, 6α,17α-dimethyltestosterone [Ackroyd, Adams, Ellis, Petrow and Stuart-Webb, J. Chem. Soc., 4103 (1957)] was treated with sodium in liquid ammonia and gave 6α,17α-dimethylandrostane-3β,17β-diol having a melting point of 208 to 209 degrees centigrade and a rotation $[\alpha]_D$ of minus nine degrees in chloroform.

EXAMPLE 4

6α,17α-dimethyl-17β-hydroxyandrostan-3-one

To a solution of one gram of 6α,17α-dimethylandrostane-3β,17β-diol in sixty milliliters of methylene chloride was added a solution of 0.5 gram of sodium dichromate in five milliliters of dilute sulfuric acid (fifty parts by volume of water to eight parts by volume of concentrated sulfuric acid). The two phase reaction mixture was stirred seventeen hours at room temperature, then ten milliliters of methanol was added. After stirring an additional two hours the mixture was diluted with water and the phases were separated. The methylene chloride phase was washed with water, dried over sodium sulfate and concentrated to dryness, giving a residue. The residue was dissolved in methanol and boiled until loss of color showed that a chromate complex present in the solution had been destroyed. The methanol solution was evaporated to dryness and the residue was dissolved in methylene chloride and filtered through a diatomaceous earth filter aid. The filtrate was evaporated to dryness and the residue was crystallized from a mixture of acetone and Skellysolve B hexanes giving 0.43 gram of 6α,17α-dimethyl-17β-hydroxyandrostan-3-one having a melting point of 178 to 181 degrees centigrade and a rotation $[\alpha]_D$ of plus eight degrees in chloroform.

Alternatively, in the same manner as given in Example 1, treating 6α,17α-dimethyltestosterone with hydrogen in the presence of a palladium catalyst is productive of 6α,17α-dimethyl-17β-hydroxyandrostan-3-one.

It is to be understood that the invention is not to be limited to the axact details of operation or exact compounds shown and described, as obvious modifications and equivalents will be apparent to one skilled in the art. The invention is therefore to be limited only by the scope of the appended claims.

We claim:

1. 3 - oxygenated - 6,17α - dimethylandrostan - 17β-ol wherein the 3-substituent is selected from the group consisting of β-hydroxy and keto.

2. 6,17α-dimethylandrostane-3β,17β-diol.

3. 6α,17α-dimethylandrostane-3β,17β-diol.
4. 6β,17α-dimethylandrostane-3β,17β-diol.
5. 6,17α-dimethyl-17β-hydroxyandrostan-3-one.
6. 6α,17α-dimethyl-17β-hydroxyandrostan-3-one.
7. 6β,17α-dimethyl-17β-hydroxyandrostan-3-one.

References Cited in the file of this patent

UNITED STATES PATENTS

| | | |
|---|---|---|
| 2,763,670 | Sondheimer et al. | Sept. 18, 1956 |
| 2,845,381 | Tindall | July 29, 1958 |